United States Patent [19]

Yamada et al.

[11] 4,079,964

[45] Mar. 21, 1978

[54] ARRANGEMENT OF A SEAT BELT TAKING-UP DEVICE

[75] Inventors: Makoto Yamada, Seto; Shiro Sasaki, Toyota, both of Japan

[73] Assignee: Toyota Jidosha Kogyo Kabushiki Kaisha, Toyota, Japan

[21] Appl. No.: 657,480

[22] Filed: Feb. 12, 1976

[30] Foreign Application Priority Data

Oct. 16, 1975 Japan .................................. 50-124650

[51] Int. Cl.² ............................................ B60R 21/10
[52] U.S. Cl. ............................ 280/747; 242/107.4 R; 297/388
[58] Field of Search ............... 280/744, 745, 746, 747; 180/82 C; 297/388, 389; 242/107.4

[56] References Cited

U.S. PATENT DOCUMENTS

| | | | |
|---|---|---|---|
| 2,855,028 | 10/1958 | Matthews | 280/744 X |
| 3,348,881 | 10/1967 | Weman | 280/747 X |
| 3,819,196 | 6/1974 | Bouthors et al. | 297/389 X |
| 3,847,434 | 11/1974 | Weman | 280/747 X |
| 3,940,164 | 2/1976 | Non | 280/745 |

Primary Examiner—Philip Goodman
Attorney, Agent, or Firm—Stevens, Davis, Miller & Mosher

[57] ABSTRACT

Retractors for shoulder belts and retractors for lap belts which are transversly positioned, relative to the longitudinal axis of the vehicle. One of said retractors is housed in a side member at the bottom of the vehicle, thereby facilitating occupants getting in and out of the vehicle. At the same time, this arrangement increases the degree of freedom in the anchorage location of the retractors in the longitudinal direction of the vehicle.

1 Claim, 4 Drawing Figures

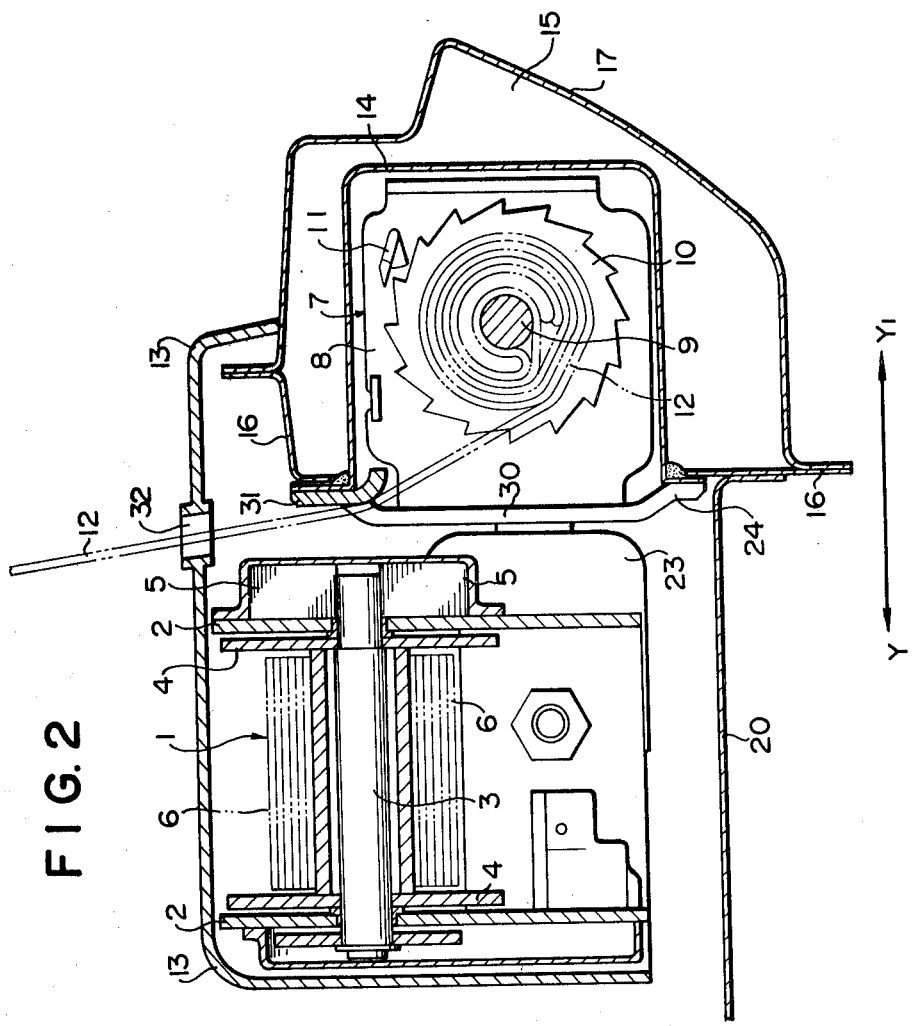
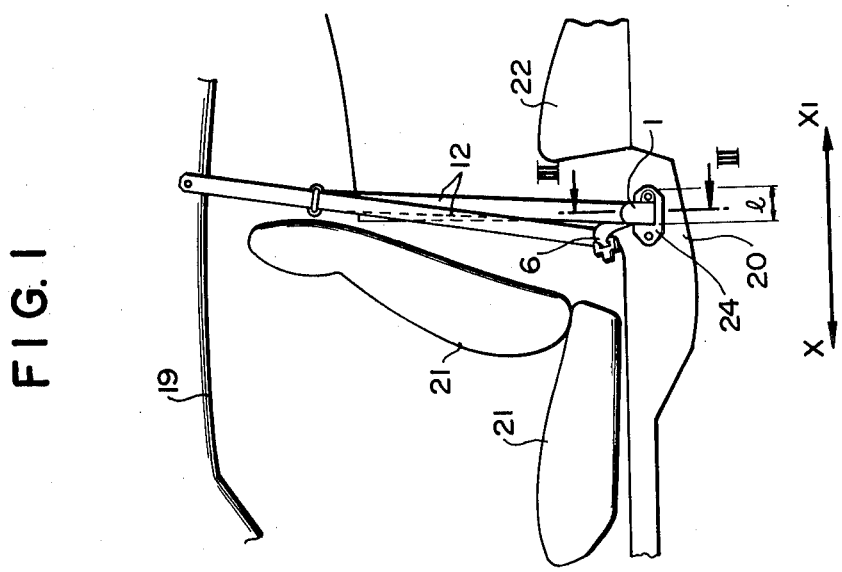

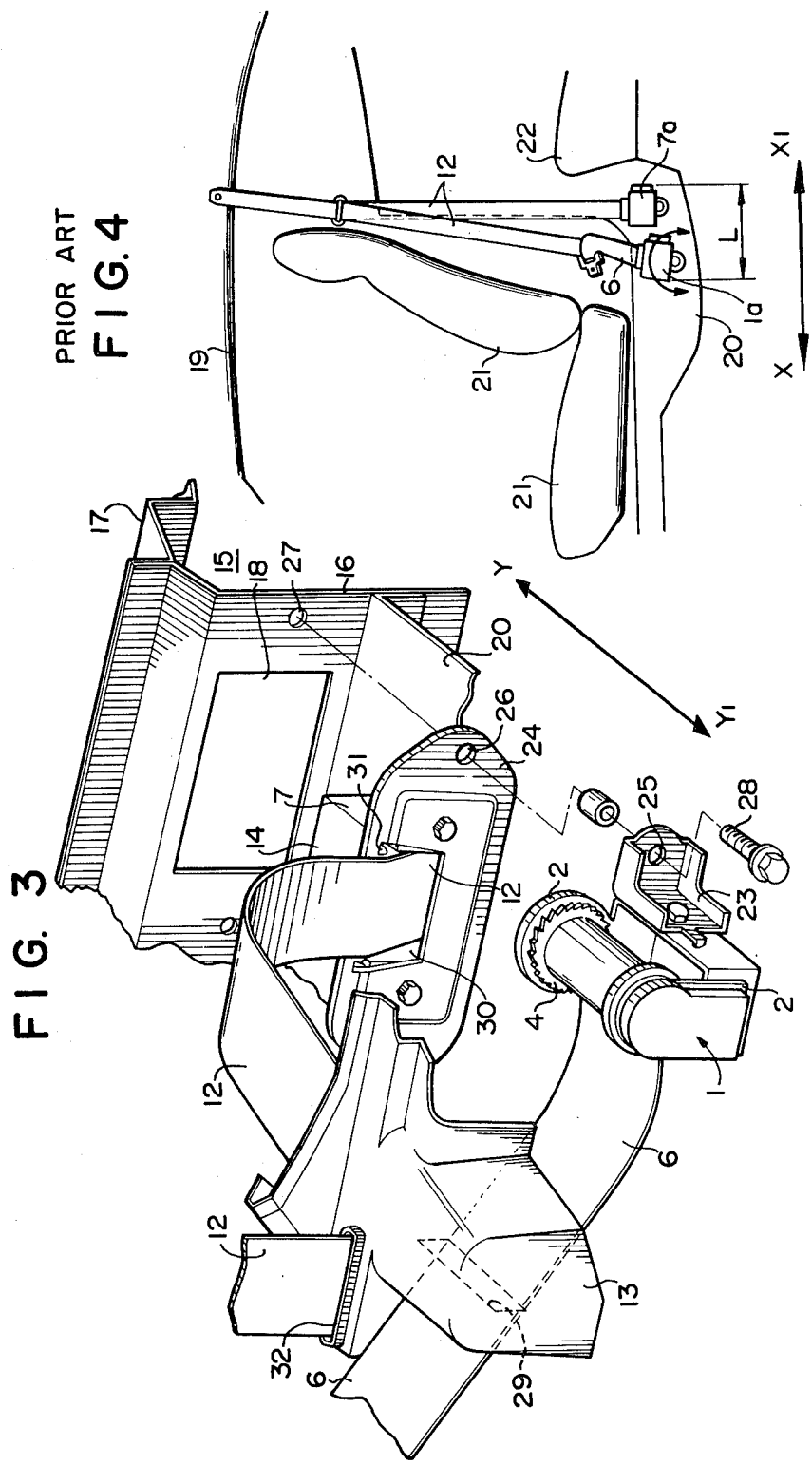

ARRANGEMENT OF A SEAT BELT TAKING-UP DEVICE

The present invention is related to an arrangement of a seat belt take-up device in a three-point type seat belt provided in automobiles and the like vehicles, wherein a retractor for a lap belt and a retractor for a shoulder belt are mounted onto a bottom member of the vehicle such as the side member thereof.

Heretofore, when the take-up device was mounted onto the bottom member of a vehicle in a three-point type seat belt having two retractors for lap belt and shoulder belt respectively, a system has been used in which, as shown in FIG. 4, the lap belt retractor 1a and the shoulder belt retractor 7a were disposed between the front seat 21 and rear seat cushion 22 that is in the longitudinal direction X - $X_1$ of the vehicle. However, according to such a conventional system, the space (L) occupied by the two retractors, disposed in the longitudinal direction X - $X_1$ of the vehicle is inevitably large and, therefore, the belts 6 and 12 tended to obstruct the occupant of the rear seat from getting in and out of the vehicle. Further, in such a conventional system, the space (L) required to mount said two retractors in the longitudinal direction X - $X_1$ of the vehicle has imposed some limitation on the mounting positions of said retractors.

Accordingly, a primary object of the invention is to provide an arrangement of a seat belt take-up device in which the lap belt retractor and the shoulder belt retractor are disposed transversely to the longitudinal axis of the vehicle, thereby permitting easier access to the back seat.

The objects and advantages of the invention will be apparent from the following description of the invention taken with reference to the accompanying drawings showing a preferred embodiment of the invention in which:

FIG. 1 is a side elevation of the arrangement according to the invention;

FIG. 2 is an enlarged sectional view taken along the line II — II of FIG. 1;

FIG. 3 is an oblique breakdown illustration of the essential parts of the construction according to the invention; and FIG. 4 is a side elevation of the conventional arrangement of a seat belt take-up device.

As shown in FIGS. 2 and 3, the lap belt retractor 1 and the shoulder belt retractor 7 are disposed, relative to each other in the transverse direction, that is across the width Y - $Y_1$, of the vehicle 20.

According to one preferred embodiment of said lap belt retractor 1 as shown in the drawings, a take-up shaft 3 is pivoted on the side walls 2, 2, and ratchet wheels are mounted on both ends of said shaft. Pawls engageable therewith, and a spiral spring 5 urge said shaft 3 toward the winding direction of said lap belt 6. When the lap belt is not used, it is kept in its retracted state, while the belt can be freely drawn out prior to its use. It is contemplated that this invention can be adapted so that when any sudden deceleration is sensed, due to a possible collision, the pawls engage with the ratchet wheels by the action of a vehicle-G sensitive emergency engagement device or the like means, thereby locking the take-up shaft 3 to prevent the lap belt 6 from being drawn out. Said pawls and the vehicle-G sensitive emergency engagement device are not shown in the drawings.

According to a preferred embodiment of the invention as shown in the drawings, the shaft 9 of the shoulder belt retractor 7 is disposed in a direction perpendicular to the shaft 3 of said lap belt retractor 1 and comprises a take-up shaft 9 pivoted on the retractor frame 8, ratchet wheels 10, 10 mounted on both ends of said shaft 9, pawls 11 engageable with said ratchet wheels 10, 10, and a spiral spring urging said shaft 9 toward the winding direction of said shoulder belt 12. The shoulder belt is kept in its wound up state when it is not used, and the belt can be freely drawn out to a necessary length prior to its use. When any shock has been imposed, said pawls 11 may be adapted to engage with said ratchet wheels 10, 10 by the action of a vehicle-G sensitive emergency engagement device as in the case of said lip belt retractor 1, thereby locking the shaft 9 to prevent said shoulder belt 12 from being drawn out. As previously stated, a vehicle-G sensitive emergency engagement device is not shown in the drawings.

Said lap belt retractor 1 is housed in a first cover 13 and said shoulder belt retractor 7 is housed in a second cover 14. Further, said shoulder belt retractor 7 and its cover 14 are housed in a side member 15 which is part of a bottom member of the vehicle.

Said side member 15 comprises a floor side panel 16 attached to the floor 20 of the vehicle 19 and a rocker outer panel 17 formed in a box shape and integrally attached to said floor side panel 16.

An insertion opening 18 of a size permitting the insertion of said second cover 14 is formed in said floor side panel 16 at a suitable position between the front seat 21 and the rear seat cushion 22. Said second cover 14 is housed in said side member 15 through said insertion opening 18. As a result, said shoulder belt retractor 7 is housed in said side member 15.

According to the preferred embodiment of the invention as shown in the drawings, said shoulder belt retractor 7 is coupled integrally to the lap belt retractor 1 by means of a bracket 23 mounted onto said lap belt retractor 1, a mountng base plate 24 for the shoulder belt retractor, bolt-through holes 25, 26 and 27 and a bolt 28 inserted through all said bolt-through holes 25, 26 and 27.

As shown in FIG. 3, the lap belt is drawn out or wound up through a guide 29 provided in said first cover 13. The shoulder belt 12 is drawn out or wound up through a guide hole 30 formed in said mounting base plate 24 for said shoulder belt retractor. A guide piece similarly is formed with a guide hole 32 in said first cover 13, as shown in FIGS. 2 and 3.

Therefore, in the arrangement according to the invention in which said lap belt retractor 1 and said shoulder belt retractor 7 are transversely disposed in the direction of the width Y — $Y_1$ of the vehicle, the drawing-out and the winding-up operations of the belts 6 and 12 can be readily accomplished.

According to said arrangement of the seat belt take-up device, since said lap belt retractor 1 and said shoulder belt retractor 7 are disposed relative to each other in the direction of the width Y - $Y_1$ of the vehicle and since said shoulder belt retractor 7 is housed in said side member 15, the mounting space in the longitudinal direction X - $X_1$ of the vehicle is shortened by the length of said lap belt retractor 1 this length protruding outwardly of said side member 15.

Further, since said shoulder belt retractor 7 is housed in said side member 15, only that portion of the width of a lap belt retractor 1 that protrudes outwardly of said side member 15 occupies otherwise useable space inside of the vehicle.

As fully described hereinbefore, according to the arrangement of the invention, the lap belt retractor 1 and the shoulder belt retractor 7 are arranged relative to each other in the direction of the width $Y - Y_1$ of the vehicle and one of the retractors is housed in said side member 15, the space in the longitudinal direction $X - X_1$ of the vehicle required for the mounting can be reduced to the length of the retractor protruding externally of said side member 15. Therefore this leads to a greater degree of freedom for mounting can be increased the retractors can be increased in the longitudinal direction $X - X_1$ of the vehicle. Further, in the direction of the width of the vehicle $Y - Y_1$, since the mounting space can be also reduced to the length of the retractor protruding externally of said side member 15, the occupant of the rear seat is not obstructed by the seat belt when getting in and out of the vehicle.

Further according to the invention, since the lap belt and the shoulder belt retractors 1, 7 can be assembled beforehand through the use of the first and the second covers 13 and 14, the efficiency of assembly can be considerably improved.

What we claim is:

1. A seat belt winding device having a shoulder belt winding retractor and a lap belt winding retractor, wherein:

said shoulder belt winding retractor has a winding shaft disposed in a direction parallel to the longitudinal axis of the vehicle;

said lap belt winding retractor has a winding shaft disposed in a direction parallel to the lateral axis of the vehicle;

said shoulder belt and lap belt winding retractors are adjacently disposed on a bottom member of the vehicle and positioned relative to each other in the lateral direction of the vehicle; and one of said shoulder belt winding retractor and lap belt retractor is housed in a side member formed of a floor side panel and a rocker outer panel, said one retractor being housed in a first cover and the other retractor being housed in a second cover, said retractors being integrally coupled to each other by means of a bracket mounted on said one retractor, a mounting base for said other retractor, aligned apertures formed in said bracket and said mounting base and said bottom member and a bolt inserted through all said aligned apertures; lap and shoulder belt drawing-out guide holes formed in said first cover and another belt drawing-out guide hole formed in said mounting base, said floor side panel being provided with an insertion opening for receiving said second cover.

* * * * *